United States Patent [19]

Crowell et al.

[11] Patent Number: 5,085,329
[45] Date of Patent: Feb. 4, 1992

[54] SHEETING SUPPORT

[76] Inventors: John W. Crowell, 6320 Litolier;
Jeffrey L. Kellerman, 8055 W. Long
Lake Dr., both of Kalamazoo, Mich.
49002

[21] Appl. No.: 624,147

[22] Filed: Dec. 7, 1990

[51] Int. Cl.⁵ .......................................... B66C 23/72
[52] U.S. Cl. ................................. 211/195; 248/166
[58] Field of Search .............. 248/165, 166, 168, 169,
248/176; 211/13, 49.1, 50, 189, 195, 198, 200,
206, 204; 182/153

[56] References Cited

U.S. PATENT DOCUMENTS

| 715,530 | 12/1902 | Wallace | 211/206 X |
| 3,071,400 | 1/1963 | Bellock | 211/206 |
| 3,249,232 | 5/1966 | Pokorski | 211/198 |
| 3,878,942 | 4/1975 | Hansen | 211/49.1 X |
| 4,699,280 | 10/1987 | Hoss | 211/195 |
| 4,752,047 | 6/1988 | Franks | 211/204 X |

FOREIGN PATENT DOCUMENTS

| 118386 | 4/1944 | Australia | 248/166 |
| 604729 | 7/1948 | United Kingdom | 211/206 |

Primary Examiner—J. Franklin Foss
Attorney, Agent, or Firm—Flynn, Thiel, Boutell & Tanis

[57] ABSTRACT

A sheeting support includes two identical end support assemblies, each having two base members pivotally coupled at first ends and two legs which are pivotally coupled to each other at their upper ends and which each have a lower end pivotally coupled to a respective base member. A connecting arrangement is provided to releasably couple the end support assemblies to each other. Each base member of each end support assembly has on an upper surface thereof a retaining strip which resists sliding movement therealong of an edge of a sheet disposed thereon, and also has at an outer end a retaining arrangement which includes a portion movable between an operational position projecting upwardly past an upper surface of the base member and a retracted position disposed below the upper surface of the base member.

19 Claims, 3 Drawing Sheets

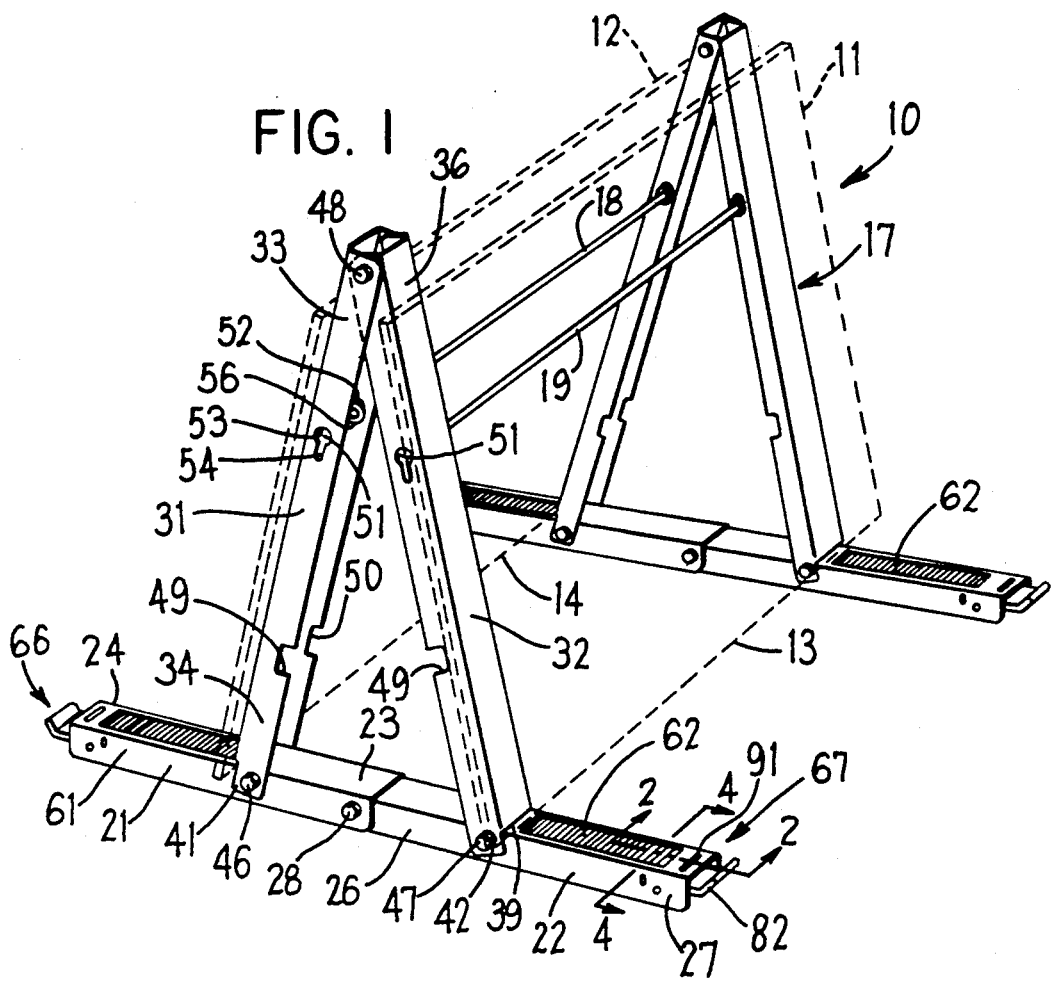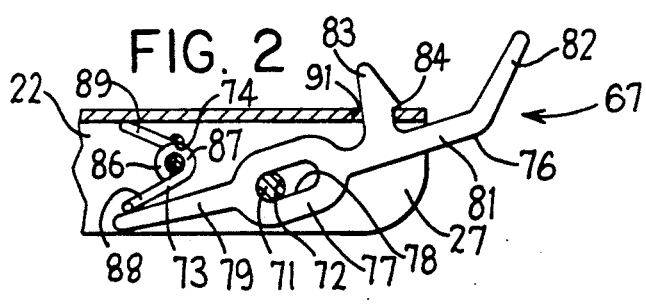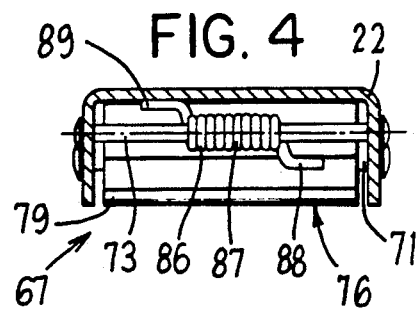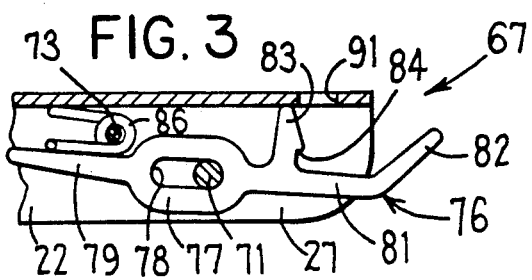

SHEETING SUPPORT

FIELD OF THE INVENTION

The present invention relates generally to a device for supporting one or more sheets of material such as plywood or plasterboard and, more particularly, to such an arrangement which is collapsible.

BACKGROUND OF THE INVENTION

There are a number of construction materials which are purchased in relatively large rigid sheets, including plywood, plasterboard, and paneling. These sheets are usually 4'×8' in dimension. When these materials are first delivered to a construction site, it is common for a stack of them to be leaned against a wall until the carpenters are ready to use them. A resulting disadvantage, however, is that if an electrician needs to run wires to an outlet located in the wall against which the sheets of material have been leaned, the sheets of material must all be moved, which is annoying, inconvenient, and an expenditure of labor which could best be applied elsewhere. The same occurs where a plumber or other professional needs access to the wall against which the sheets of material are leaned.

Accordingly, it has become common in the construction industry to build a device which is sometimes referred to as an "A-frame". This device has a single long two-by-four which serves as a base member, which lays on the floor, and which may even be nailed to the floor. Two additional two-by-fours which serve as legs are arranged in an inverted "V" and are nailed to each other at their upper ends and to the base member at their lower ends, the base member and legs together defining a support assembly. Sometimes an identical support assembly is built and then the two support assemblies are connected to each other by one or more two-by-fours which extend between them and are nailed to each. This device can be placed in the middle of a room of the building under construction, and then a number of sheets of material can be placed on the base member and can lean against the legs. Since these sheets of material are not leaning against any of the walls of the building, the walls are all freely accessible and the plumbing and electrical work in them can be completed without any need to move all of the sheets of material one or more times.

An important problem with this conventional support device or "A-frame" is that it is not collapsible, and thus is not easy to move to another construction site. Consequently, it is often discarded at the time construction is completed, or is disassembled, transported to a new site, and then nailed back together. In either case, materials and/or labor are essentially wasted.

An object of the present invention is to provide a sheeting support which is collapsible, in order to facilitate portability.

A further object is to provide such a sheeting support which will provide stable and dependable support for sheets of material despite its collapsibility.

A further object is to provide such a sheeting support which can be collapsed and erected rapidly and by only one person.

A further object is to provide such a sheeting support which is relatively simple in design and inexpensive to manufacture, and which has a relatively low weight.

SUMMARY OF THE INVENTION

The objects and purposes of the invention, including those set forth above, are met by providing a collapsible sheeting support having first and second base members which each have a first end and which are coupled to each other at their first ends for relative pivotal movement about a first axis, and first and second legs which each have upper and lower ends and which are coupled to each other in the region of the upper ends for relative pivotal movement about a second axis substantially parallel to the first axis. The lower ends of the first and second legs are respectively pivotally coupled to the first and second base members at locations thereon spaced from the first ends thereof for pivotal movement relative thereto about respective third and fourth axes which are each substantially parallel to the first axis. The first base member has a second end spaced from its first end, and the third axis is located between the first and second ends of the first base member. A retaining arrangement is provided on the first base member on a side of the third axis remote from the first end thereof, and resists sliding movement in a direction away from the first end of an edge of a sheet of material disposed on the first base member.

BRIEF DESCRIPTION OF THE DRAWINGS

Two preferred embodiments of the invention will be described in detail hereinafter with reference to the accompanying drawings, in which:

FIG. 1 is s a perspective view of a collapsible sheeting support which embodies the present invention;

FIG. 2 is a sectional view of a portion of the sheeting support of FIG. 1 taken along the line 2—2, including a retaining member;

FIG. 3 is a sectional view which is similar to FIG. 2 but shows a different operational position of the retaining member;

FIG. 4 is a sectional view taken along the line 4—4 in FIG. 1,;

DETAILED DESCRIPTION

Figure 5:
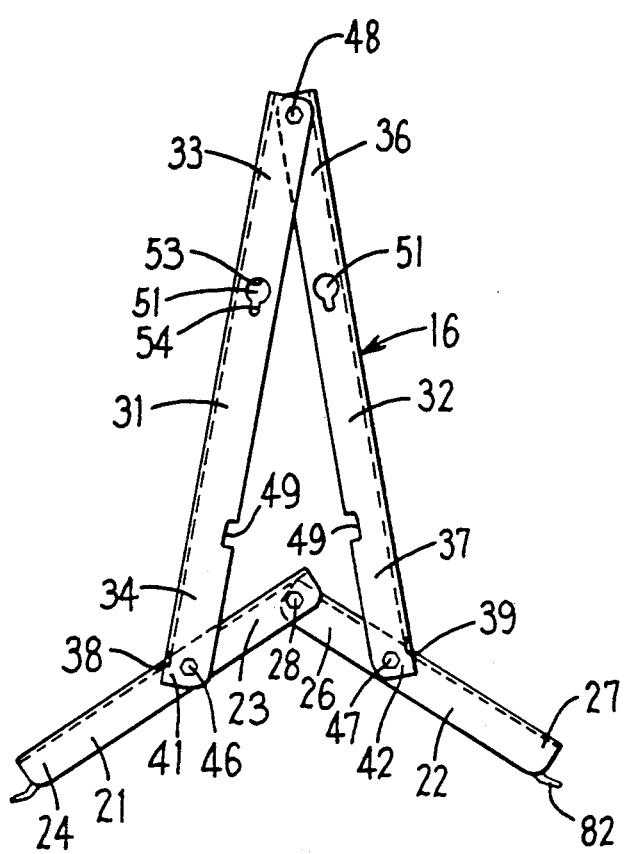
FIG. 5 is an elevational side view showing in a partially collapsed condition an end support assembly which is a component of the sheeting support of FIG. 1.

FIG. 1 shows a collapsible sheeting support 10 which embodies the present invention and is used to support one or more sheets of material 11 and 12 on each side thereof, the lower edges of the sheeting being indicated at 13 and 14.

The sheeting support 10 includes two end support assemblies 16 and 17 which are connected to each other in a manner described below by two connector rods 18 and 19. The end support assemblies 16 and 17 are identical, and therefore only the end support assembly 16 is described in detail.

The end support assembly 16 includes two elongate base members 21 and 22 each made of a U-shaped metal channel having two planar side walls connected by a planar main wall, the base member 21 having an inner end 23 and an outer end 24, and the base member 22 having an inner end 26 and an outer end 27. The inner end 26 of the base member 22 is positioned between the side walls of the inner end 23 of the base member 21, and a bolt 28 disposed in aligned openings in the side walls of the inner ends 23 and 26 extends completely through the base members 21 and 22 and carries a not-illustrated nut at the end of its threaded shank. The bolt 28 facilitates relative pivotal movement of the base members 21 and 22 in a manner described in more detail later.

The end support assembly 16 also includes two legs 31 and 32, which are each made of an elongate U-shaped metal channel. The leg 31 has an upper end 33 and lower end 34, and the leg 32 has an upper end 36 and a lower end 37. As best seen in FIGS. 1 and 5, the leg 32 has a cut-out 39 in the main wall of the channel so that the outwardly projecting ends of the side walls serve as flanges 42 which are disposed on opposite sides of the base member 22. A similar cut-out 38 is present at the lower end of leg 31, and defines two flanges 41 which are disposed on opposite sides of the base member 21. A bolt 46 extends through aligned openings in both flanges 41 and the side walls of base member 21, the bolt 46 being parallel to the bolt 28 and disposed at a location spaced from each end of the base member 21, to thereby pivotally couple the lower end of leg 31 to the base member 21. A not-illustrated nut is provided on the threaded end of the shank of bolt 46. In a similar manner, a bolt 47 and associated nut pivotally couple the lower end of leg 32 to the base member 22 at a location between the ends of the base member 22. The upper end 36 of the leg 32 is disposed between the side walls of the upper end 33 of leg 31, and a bolt 48 extends through aligned openings in the side walls of the upper ends of both legs 31 and 32 in order to effect a pivotal coupling between them. The threaded end of bolt 48 carries a not-illustrated nut.

Aligned rectangular cut-outs or notches 49 and 50 are provided in the respective side walls of the leg 31, and similar cut-outs are provided in the leg 32. Above the notches 49 and 50, the respective side walls of leg 31 have aligned keyhole-shaped openings 51 and 52, each opening having an upper portion 53 which is a circular hole and a lower portion 54 which is a slot extending downwardly from the hole 53, the width of the slot 54 being smaller than the diameter of the hole 53. Similar aligned keyhole-shaped holes are provided in the respective side walls of the leg 32.

Figure 7:
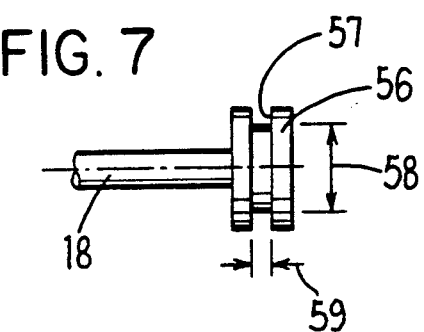
FIG. 7 is a side view of an end portion of a connecting rod which is a component of the sheeting support of FIG. 1.

The connector rods 18 and 19 are identical, and each of the rods has at each end a connector part 56 (FIGS. 1 and 7). Each connector part 56 is cylindrical, and has a diameter which is slightly less than the diameter of the circular holes 53 in the legs 31 and 32. Each connector part 56 has a circumferentially extending groove 57 of rectangular cross section, the diameter of the connector part 56 in the region of groove 57 being slightly less than the width of the slots 54 in the legs 31 and 32. The axial width 59 of the groove 57 in each connector part 56 is slightly greater than the thickness of the side walls of the legs 31 and 32. The rods 18 and 19 are releasably connected to the end support assemblies 16 and 17 by inserting each cylindrical connector part 56 through the circular hole 53 of a respective opening 51 and then dropping it downwardly so that the slot 54 of the opening 51 slidably receives the reduced diameter portion of the connector part 56.

Referring to FIG. 1, the base members 21 and 22 of the end support assembly 16 each have on a top surface thereof a retaining strip 62 which extends from a location adjacent the lower end of the associated leg 31 or 32 in a direction lengthwise of the base member toward its outer end. In the preferred embodiment, the retaining strips 61 and 62 are rectangular pieces of adhesive-backed sheet material having on the upper side thereof a rough or non-skid surface. However, it will be recognized that the retaining strips 61 and 62 could also each be made by stamping or machining transversely extending grooves or ribs in the base members 21 and 22, or by applying paint containing sand or some other granular material.

Each of the base members 21 and 22 of the end support assembly 16 have at the outer end thereof a respective retaining mechanism 66 or 67. The retaining mechanisms 66 and 67 are identical, and thus only the retaining mechanism 67 on base member 22 is described in detail.

Referring to FIGS. 2 and 4, the retaining mechanism 67 includes a cylindrical pin 71 which extends through aligned circular holes 72 in the side walls of the base member 22, and which has its ends upset against the side walls of the base member to prevent axial movement. A further cylindrical pin 73 extends through aligned vertical slots 74 in the side walls of the base member, and also has its ends upset. A retaining member 76 has an elliptical portion 77 which in turn has a slot 78 extending in a direction approximately lengthwise of the retaining member 76. The pin 71 extends slidably through the slot 78, and thus the retaining member 76 can pivot on the pin 71. The retaining member 76 also has an end portion 79 which extends outwardly from the elliptical portion 77 approximately parallel to the slot 78, and an intermediate portion 81 which extends outwardly from the opposite side of the elliptical portion 77 in an opposite direction. An operating portion 82 extends outwardly and upwardly from the outer end of the intermediate portion 81. A retaining projection 83 projects upwardly from the intermediate portion 81 near the elliptical portion 77, and has at a location spaced below its upper end a downwardly facing lip 84.

A coil spring 86 has a coil 87 which encircles the pin 73, and has legs 88 and 89 which respectively engage the end portion 79 of retaining member 76 and the underside of the horizontal main wall of the base member 22. The spring 86 urges the end portion 79 of retaining member 76 downwardly, so that the retaining member 76 is urged to pivot counterclockwise in FIG. 2.

The horizontal main wall of the base member 22 has near its outer end a transversely extending rectangular slot 91. The retaining projection 83 of the retaining member 76 can project upwardly through the slot 91 as shown in FIG. 2, and can also be positioned as shown in FIG. 3 so that its upper end engages the underside of the main wall of the base member 22 at a location adjacent the slot 91.

Figure 8:
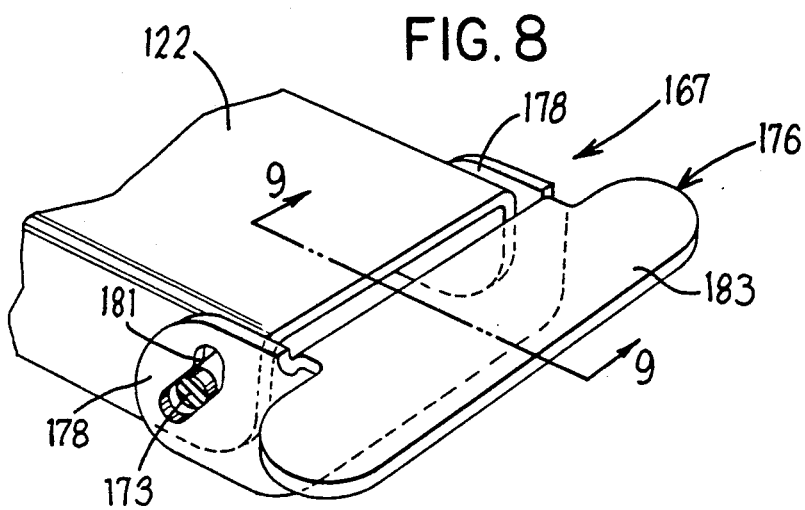
FIG. 8 is a fragmentary perspective view of a base member and a retaining mechanism in an alternative embodiment of the sheeting support of FIG. 1.
Figure 10:
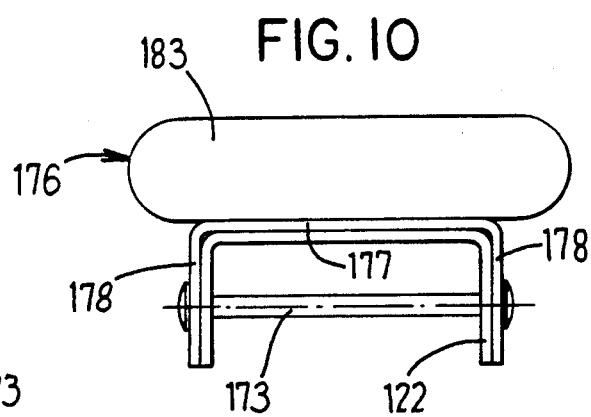
FIG. 10 is an end view of the base member and retaining mechanism of FIG. 8 with a retaining member thereof in a different operational position.

FIGS. 8 through 11 show a retaining mechanism 167 which is an alternative embodiment of the retaining mechanism 67 shown in FIGS. 2-4. In FIGS. 8 and the retaining mechanism 167 includes a retaining member 176 having a planar central portion 177 and having planar flanges 178 extending outwardly from opposite ends of the central portion 177. The flanges 178 are disposed on opposite sides of the base member 122, and have aligned slots 181 which are inclined to extend at approximately 45° with respect to the planar central portion 177. A pin 173 extends through the slots 181 and through aligned circular openings in the side walls of the base member 122, and as shown in FIG. 10 is upset at each end. Referring again to FIGS. 8 and 9, the retaining member 176 also has a planar retaining projection 183 which projects outwardly from a side edge of the central portion 177 in a direction opposite to the direction in which the flanges 178 project, the flanges 178 being perpendicular to the central portion 177, and the retaining projection 183 being perpendicular to the flanges 178 and central portion 177. The retaining member 176 is a single structural part made from a single piece of bent sheet metal.

OPERATION

FIG. 1 shows the collapsible sheeting support 10 in a normal operational configuration, with the base members 21 and 22 of each end support assembly 16 and 17 resting flat on a floor surface. The sheeting 11 which usually is a standard sized sheet-like construction material, such as 4'×8' sheets of plywood or plasterboard, has its lower edge 13 resting on the upper surface of the base member 22 of the end support assemblies 16 and 17. The lower edge 13 engages the retaining strip 62 on each such base member, and the retaining strip 62 resists sliding movement of the lower edge 13 outwardly along the base member. The upper end of the sheet 11 leans against the upper end portion 36 of the leg 32 of each end support assembly 16 and 17. Additional sheets can be stacked against the sheet 11 in a similar manner, and as shown in FIG. 1, one or more sheets of material 12 may be stacked against the opposite side of the sheeting support 10 in an identical manner. Each of the retaining mechanisms 66 and 67 is in the position shown in FIG. 2, in which the projection 83 extends upwardly through the slot 91 and has its lip 84 engaging an edge of the slot 91. If the lower edge 13 of one or more of the sheets of material 11 or 12 does start to slide outwardly along either base member despite the retaining strip 62, the outermost sheet will eventually slide up against the projection 83, which will stop the sliding movement.

The sheeting support 10 can be collapsed in the following manner when all of the sheets of material 11 and 12 have been removed from it. First, the rods 18 and 19 are each lifted so that the connector part 56 at the end of each slides upwardly within the slot 54 in leg 31 or 32 and into the circular hole 53, and is then removed from the hole 53. This disconnects the end support assemblies 16 and 17 from the rods 18 and 19 and from each other. Then, each retaining mechanism 66 or 67 is moved from its operational position (FIG. 2) to its retracted position (FIG. 3). In particular, referring to FIG. 2, the operating portion 82 is manually grasped and is pressed a small distance leftwardly in FIG. 2 so that the pin 71 slides slightly within slot 78 and the lip 84 on projection 83 moves out of engagement with the edge of slot 91. Then, the operating portion 82 is manually pressed downwardly so that the retaining member 76 pivots clockwise about pin 71 while the projection 83 moves downwardly out of the slot 91, the end portion 79 compressing the spring 86. As the spring 86 is compressed, the pin 73 on which it is supported moves from the lower end to the upper end of the slot 74. Then, the operating member 82 is manually moved further leftwardly, so that the pin 71 slides to the right end of slot 78, after which the operating portion 82 is manually released. The retaining mechanism 67 will then be in the position shown in FIG. 3, in which the projection 83 is offset from the slot 91 and has its upper end engaging the underside of the main wall of the base member, the spring 86 urging the retaining member 76 to pivot counterclockwise and thus urging the upper end of the projection 83 against the underside of the main wall of the base member.

Figure 6:
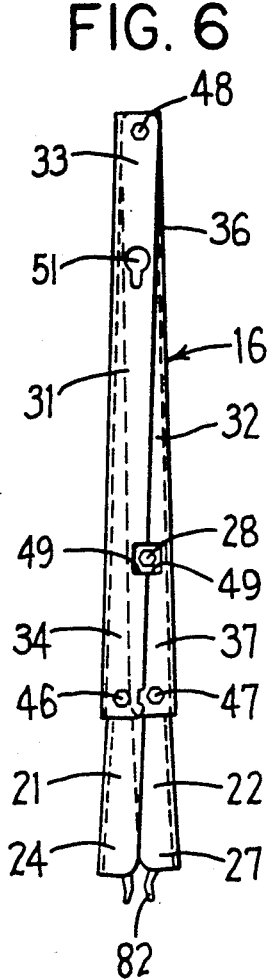
FIG. 6 is an elevational side view similar to FIG. 5 but showing the end support assembly in a fully collapsed condition.

Then, the end support assembly is lifted, and the outer ends 24 and 27 of the base members 21 and 22 are manually pressed downwardly so that, as shown in FIG. 5, the base members 21 and 22 pivot relative to each other about the bolt 28 until they ultimately reach the position shown in FIG. 6, in which their outer ends 24 and 27 are adjacent. In this position, the notches 49 and 50 in the legs 31 and 32 receive the head of the bolt 28 and the nut at its opposite end, permitting the end support assembly to be collapsed further than would be possible if there were no notches and the bolt 28 and associated nut came into direct contact with edges of the side walls of the legs 31 and 32. The end support assembly 17 is then collapsed in an identical manner.

In order to erect the sheeting support assembly 10 from its fully collapsed condition, the sequence of steps just described for collapsing the sheeting support 10 is carried out in a reverse order.

Turning to FIGS. 8-11, the operation of the alternative retaining mechanism 167 will be briefly described. During normal operation, the retaining member 176 is in the position shown in FIGS. 10 and 11, in which the central portion 177 of the retaining member 176 is disposed against the top surface of the base member 122, the pin 173 being disposed at the upper end of the inclined slot 181 and the retaining projection 183 projecting vertically upwardly. If the lower edge of a sheet supported on the base member 122 slides outwardly and engages the retaining projection 183, the inclined orientation of slot 181 will direct the retaining member 176 rightwardly and downwardly in FIG. 11, but the engagement of the central portion 177 with the top of base member 122 will prevent it from moving at all and will consequently cause it to halt sliding movement of the lower edge of the sheet.

Figure 11:
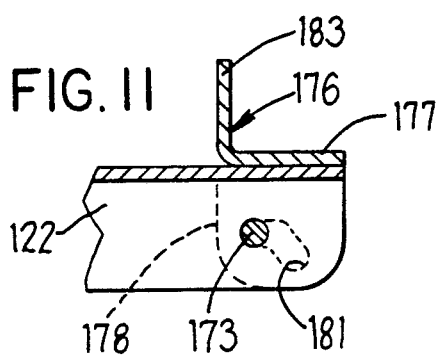
FIG. 11 a sectional view similar to FIG. 9 but showing retaining member in the same operational position as FIG. 10.
Figure 9:
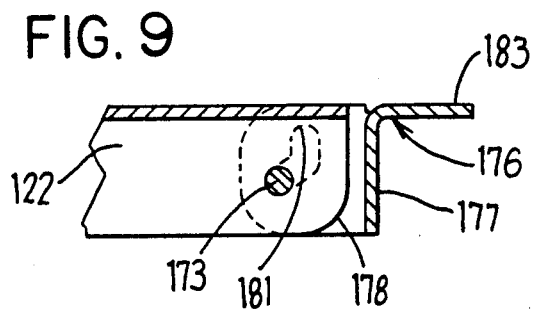
FIG. 9 is a sectional view taken along the line 9—9 in FIG. 8.

In order to move the retaining member 176 from its operational position (FIG. 11) to its retracted position (FIG. 9), the retaining member 176 is manually grasped and moved upwardly and leftwardly in FIG. 11 until the pin 173 reaches the lower end of the slot 181, and then it is pivoted 90° clockwise in FIG. 11 to the retracted position shown in FIG. 9. Carrying out these two steps in reverse order will move it from its retracted position back to its operational position.

Although two preferred embodiments of the invention have been shown in detail for illustrative purposes, it will be recognized that variations and modifications of the disclosed embodiments, including the rearrangement of parts, lie within the scope of the present invention.

For example, although the preferred embodiment of the sheeting support assembly 10 shown in FIG. 1 has metal parts, it will be recognized that some or all of the parts could be made from other materials, including plastic. Further, it will be recognized that if the width of the end support assembly 16 were increased (in a direction parallel to the rod 19 in FIG. 1) it could be used alone without any need for the other end support assembly or the rods and 19.

The embodiments of the invention in which an exclusive property or privilege is claimed are defined as follows:

1. A collapsible support for a sheet of building material, comprising: first and second base members which each have a first end and which are coupled to each other at said first ends for relative pivotal movement about a first axis; first and second legs which each have upper and lower ends and which are coupled to each other in the region of said upper ends for relative pivotal movement about a second axis substantially parallel to said first axis, said lower ends of said first and second legs being respectively pivotally coupled to said first and second base members at locations thereon spaced from said first ends thereof for pivotal movement relative thereto about respective third and fourth axes which are each substantially parallel to said first axis, at least said first base member having a second end spaced from said first end thereof and said third axis being between said first and second ends of said first base member, at least said first base member having an upwardly facing support surface on a portion thereof between said third axis and said second end so that said upper surface thereof is available for supporting an edge portion of said sheet of building material thereon.

2. A support as recited in claim 1, wherein said retaining means is provided on a first base member on a side of said third axis remote from said first end thereof for resisting sliding movement in a direction away from said first end of an edge of a sheet disposed on said first base member.

3. A support as recited in claim 2, wherein said retaining means includes a retainer strip provided on said first base member between said third axis and said second end thereof.

4. A support as recited in claim 2, wherein said retaining means includes a retainer projection which projects upwardly above an upper surface of said first base member near said second end of said first base member.

5. A support as recited in claim 2, wherein said retaining means includes a retainer member supported on said first base member in the region of said second end thereof for movement between an operational position in which a portion of said retainer member projects above an upper surface of said first base member and a retracted position in which said retainer member is disposed below said upper surface of said first base member.

6. An apparatus as recited in claim 5, wherein said first base member is a downwardly open U-shaped channel having a main wall and two downwardly projecting side walls, said main wall having an opening therethrough adjacent said second end of said first base member; and wherein said portion of said retaining member is an upward projection having a downwardly facing lip spaced below an upper end thereof, said retainer member being supported below said main wall of said channel, wherein in said operational position said projection extends upwardly through said opening in said main wall and said lip thereon is in engagement with an edge of said opening, and in said retracted position said projection is disposed below said main wall.

7. An apparatus as recited in claim 6, wherein said retaining means includes a pin extending between and secured to said side walls of said first base member, said retaining member having therein an elongate slot which extends approximately perpendicular to said projection thereon and which slidably receives said pin, said retainer member further having a manually engagable portion which projects outwardly beyond said second end of said first base member.

8. A support as recited in claim 7, wherein said retaining means includes resilient means yieldably urging pivotal movement of said retaining member about said pin in a direction corresponding to upward movement of said projection thereon.

9. A support as recited in claim 8, wherein said retaining means includes a vertical slot provided in each said side wall of said first base member, and a further pin having each end slidably supported in a respective said vertical slot, and wherein said resilient means includes a coil spring which is provided around said further pin and which has first and second legs respectively engaging a portion of said retaining member and an underside of said main wall of said first base member.

10. A support as recited in claim 5, wherein said portion of said retaining member projects outwardly therefrom and said retaining member has first and second spaced flanges which each include an elongate slot extending at an angle to said projection thereon, and including on said first base member first and second transversely extending pin portions which are each slidably received in the slot in a respective said flange, said portion of said retaining member moving toward and away from said first base member as said pin portions slide between first and second ends of said slots, respectively, and said retaining member being pivotal between said operational and retracted positions when said pin portions are at said second ends of said slots.

11. A support as recited in claim 10, wherein said retaining member is made from a single piece of bent sheet metal, and has a substantially planar central wall, said flanges projecting outwardly from opposite ends of said central wall substantially perpendicular thereto, and said portion thereof being planar and projecting outwardly from an edge portion of said central wall substantially perpendicular to said central wall and said flanges.

12. A support as recited in claim 11, including a pin which extends transversely through said base member, said pin portions being respective portions of said pin located adjacent opposite ends thereof, each end of said pin being upset adjacent a respective said flange of said retaining member.

13. A support as recited in claim 1, wherein said base members and said legs are each a U-shaped channel having a main wall and two spaced side walls extending outwardly from opposite edges of said main wall, wherein said first end of said first base member is disposed between said side walls of said second base member, and including a first bolt extending through aligned holes in said side walls of said first and second base members coaxial with said first axis, wherein said upper end of said first leg is disposed between said side walls of said second leg, and including a second bolt extending through aligned openings in said side walls of said first and second legs coaxial with said second axis, and wherein each of said legs has at said lower end thereof a cut-out in said main wall thereof so that each leg has outwardly projecting flanges which are portions of said side walls thereof and which are disposed on opposite sides of a respective said base member, and including third and fourth bolts which each extend through a respective said base member and both flanges of a respective said leg coaxial with a respective one of said third and fourth axes.

14. A support as recited in claim 13, wherein said side walls of said legs each have a notch, and wherein said notches can each receive an end of said first bolt during relative pivotal movement of said base members.

15. A support as recited in claim 1, wherein said second base member has a second end spaced from said first end thereof, said fourth axis being between said first and second ends of said second base member, and wherein said second base has an upwardly facing support surface on a portion thereof between said fourth axis and said second end thereof is available for supporting an edge portion of said sheet of building material thereon.

16. A support as recited in claim 15, wherein a further retaining means is provided on said second base member on a side of said fourth axis remote from said first end thereof for resisting sliding movement in a direction away from said first end thereof of an edge of a sheet disposed thereon.

17. A support as recited in claim 2, wherein said first and second base members and said first and second legs are portions of a first support assembly; and including a second support assembly which includes: third and fourth base members which each have a first end and which are coupled to each other at said first ends for relative pivotal movement about a fifth axis, third and fourth legs which each have upper and lower ends and which are coupled to each other in the region of said upper ends thereof for relative pivotal movement about a sixth axis substantially parallel to said fifth axis, said lower ends of said third and fourth legs being respectively pivotally coupled to said third and fourth base members at locations thereon spaced from said first ends thereof for pivotal movement relative thereto about respective seventh and eighth axes which are each parallel to said fifth axis, said third base member having a second end spaced from said first end and said seventh axis being between said first and second ends of said third base member, and further retaining means provided on said third base member on a side of said seventh axis remote from said first end thereof for resisting sliding movement in a direction away from said first end thereof of an edge of a sheet disposed thereon; and including connecting means for releasably coupling said first and second support assemblies to each other.

18. A support as recited in claim 17, wherein said connecting means includes in a side wall of each said leg of each said support assembly a keyhole-shaped opening, and including two connecting rods which each have at each end thereof a connecting part releasably engagable with a respective said keyhole-shaped opening.

19. A collapsible support for supporting a sheet of building material on edge on a support surface, comprising: first and second base members which each have a first end and coupling means for coupling said first ends together; first and second legs which each have upper and lower ends and which are coupled to each other in the region of said upper ends for relative pivotal movement about a first axis, a first acute angle being defined between said first and second legs at said upper ends, said lower ends of said first and second legs being respectively pivotally coupled to said first and second base members at locations thereon spaced from said first ends thereof for pivotal movement relative thereto about respective second and third axes which are each substantially parallel to said first axis, a second acute angle being defined between each said first and second legs and respective one of said first and second base members, at least said first base member having a second end spaced from said first end thereof and said second axis being between said first and second ends of said first base member, and means for facilitating an altering of said coupling means and a pivoting of respective ones of said first and second base members with respect to each said first and second legs to reduce the size of said second acute angle therebetween to allow for said first and second legs to pivot about said first axis to reduce the size of said first acute angle only in response to a vertical upward lifting of said support to cause said first and second base members to become free of engagement with the support surface.

* * * * *